United States Patent
Goldberg et al.

[15] 3,687,209
[45] Aug. 29, 1972

[54] WEIGHING DEVICE

[72] Inventors: Marvin E. Goldberg, Monsey, N.Y.;
George Pollack, Fairlawn, N.J.

[73] Assignee: Revlon, Inc.

[22] Filed: Dec. 16, 1971

[21] Appl. No.: 208,738

[52] U.S. Cl. .................177/233, 177/126, 177/245
[51] Int. Cl. ......G01g 3/02, G01g 19/52, G01g 23/00
[58] Field of Search......177/232, 233, 225, 126, 127, 177/144, 245

[56] References Cited

UNITED STATES PATENTS

| 421,221 | 2/1890 | Zwiesler et al. | ...........177/232 |
| 739,047 | 9/1903 | Wilson | ......................177/126 |
| 797,091 | 8/1905 | Wilson | ......................177/232 |
| 1,281,389 | 10/1918 | Kaupert | ....................177/232 |
| 2,009,363 | 7/1935 | Schewier | ..................177/232 |

FOREIGN PATENTS OR APPLICATIONS

| 612,350 | 4/1935 | Germany | ..................177/127 |
| 1,037,598 | 7/1966 | Great Britain | .............177/233 |

*Primary Examiner*—Robert S. Ward, Jr.
*Attorney*—Leon E. Tenenbaum

[57] ABSTRACT

A weighing device for aerosol containers which also functions as a cap for the container.

1 Claim, 5 Drawing Figures

PATENTED AUG 29 1972 3,687,209

WEIGHING DEVICE

The present invention relates to a weighing device, and, more particularly, to a device for weighing containers such as aerosol dispensing containers.

Containers, such as aerosol containers, are for the most part constructed of opaque materials, and it is not possible by visual inspection to determine how full such containers are. It is also difficult to estimate how much material remains in an opaque container merely by lifting it or by shaking it. Furthermore, it is impractical to weigh such a container on a separate weighing means each time it is desired to know how much material remains in the container. Even if weighing means are available for weighing the container, the use of such means is complicated by the fact that the weight of the container must be known and taken into account before the contents remaining in the container can be determined. Furthermore, cost and convenience factors incident to the use of separate weighing means create problems.

Various devices have been devised to overcome these and other difficulties and at the same time provide means indicating approximately the remaining contents of an aerosol container. However, for the most part, these known devices have been relatively expensive to construct and have been difficult to attach to the containers. Some of these known devices required modification of the containers thereby increasing the expense. Others of these known devices were inconvenient to use and created difficulties in packaging and storing the container.

It is accordingly an object of the present invention to provide a weighing device which may be used conveniently to determine the amount of material present in an aerosol container.

It is another object of the present invention to provide a weighing device which is inexpensive to construct.

It is still another object of the present invention to provide a weighing device for weighing an aerosol container which device may also be used as the cap for the container.

It is a further object of the present invention to provide a weighing device for use with aerosol containers, which use will not require any structural or other modifications of the container.

These and other objects will become apparent from a reading of the following description taken in conjunction with the accompanying drawings.

The present invention provides a calibrated device for use with an aerosol container for indicating the amount of material remaining in the container, comprising a cap which fits over the top of the container. Preferably, the cap is cylindrical. Fitting against the inner surface of the cap but movable in relation thereto is a cylinder provided with a top portion. A spring or other compressible means is attached to the inner surface of the cap and to the outer surface of the top portion of the inner movable cylinder. The inner cylinder is provided with a longitudinal slit in its side portion, extending from just below the upper end of the cylinder to the lower end, but terminating before reaching the lower end by curving laterally to form a short lateral slip. The slip engates a pin projecting inwardly from the inside of the cap, said pin being positioned at the lower end of the cap. The pin is of integral construction with the cap; however, the pin may be in the form of a movable screw which is inserted in and may be moved in a hole which has been made in the desired position in the side of the cap.

By moving the inner cylinder into the cap until the lateral slip is in contact with the pin and then turning the inner cylinder so that the pin engages the lateral slip, the inner cylinder is set in a locked position. The inner cylinder and cap are of such length so that, when the inner cylinder is in the locked position and the cap is placed on the top of the aerosol container, no contact will be made with the exposed dispensing means of the container.

To use the device of the present invention, the cap is removed from the aerosol container and the inner cylinder is released from its locked position by disengaging the pin from the lateral slip. This is readily achieved by turning the inner cylinder in the proper direction. The spring then forces the inner tube out. The aerosol container is then placed on top of the cap and the weight of the container will push the cap down. The outer side of the inner cylinder is provided with a calibrated scale, and the indicator, for use with the scale, is the bottom of the cap. By reading the scale, one can then determine the amount of material remaining in the container.

The cap and inner cylinder may be constructed of any suitable material such as, for example, a thin sheet metal such as aluminum or tin, or a plastic such as polypropylene, polyethylene, or other suitable plastics.

Figure 1:
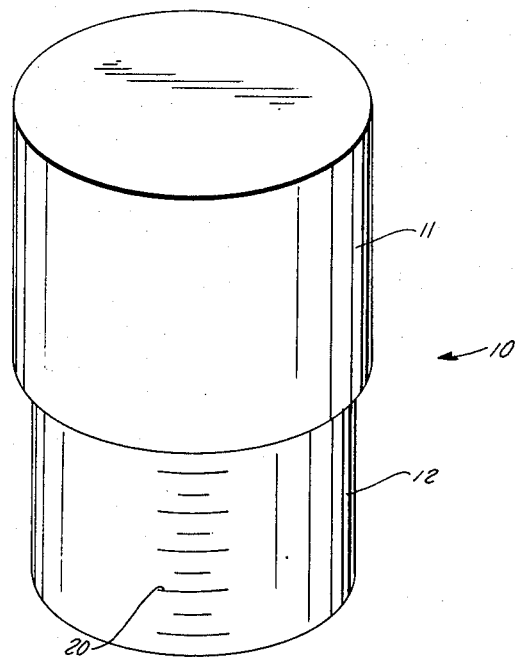
FIG. 1 is a perspective view of the assembled device of the present invention showing the inner movable cylinder in the unlocked position.
Figure 2:
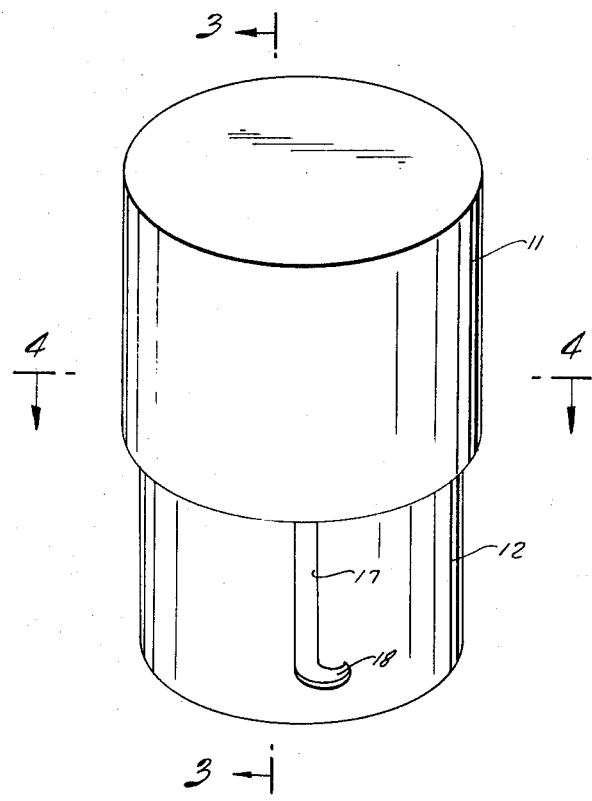
FIG. 2 is a different perspective view of the assembled device showing the inner movable cylinder in the unlocked position.
Figure 3:
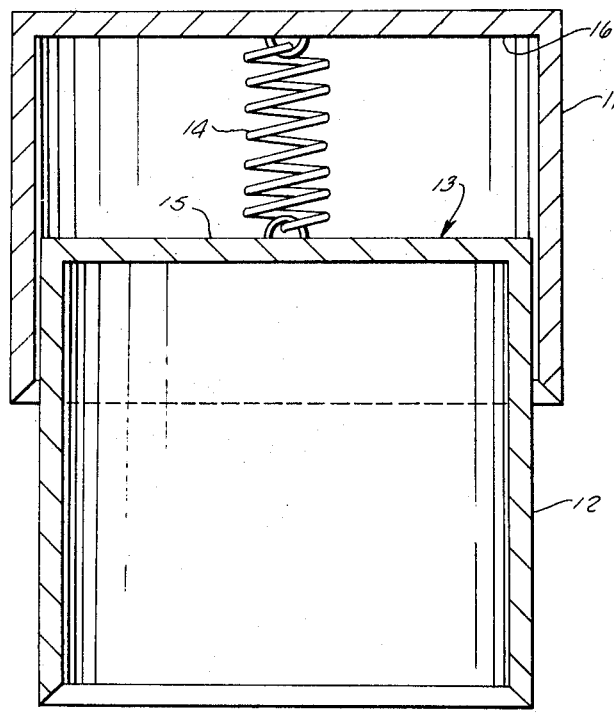
FIG. 3 is a cross-sectional view taken along the line 3—3 of FIG. 2.
Figure 5:
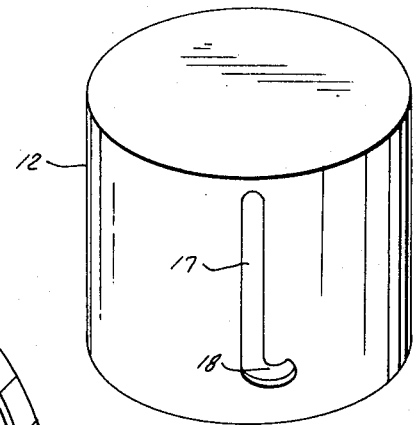
FIG. 5 is a perspective view of the disassembled inner cylinder showing the slit.
Figure 4:
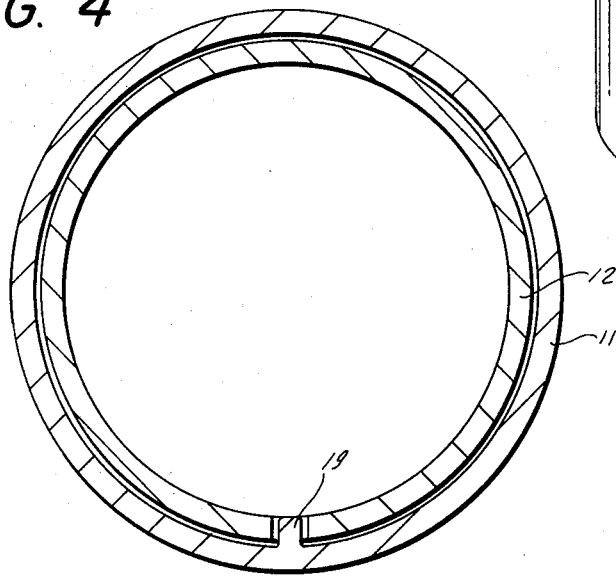
FIG. 4 is a cross-sectional view taken along the line 4—4 of FIG. 2.

Referring to the drawings which illustrate a preferred embodiment of the present invention, reference numeral 10 generally indicates the weighing device.

The device includes a cap 11 and an inner cylinder 12 inside the cap and movable in relation thereto. The inner cylinder is provided with a top portion 13. A spring 14 is attached to the outer side 15 of said top portion and to the inner side 16 of the top portion of the cap. The side of the inner cylinder is provided with a longitudinal slit 17 extending from just below the upper end of the cylinder and terminating before reaching the lower end by curving to form a short lateral slip 18. The slip engages a pin 19 which projects inwardly from and is of integral construction with the cap. The inner cylinder is also provided with a calibrated scale 20 on its side, which scale is used to indicate the amount of material in the aerosol container when the container is placed on the top of the cap.

We claim:

1. A weighing device for aerosol containers comprising a cap and an inner cylinder inside the cap and movable in relation thereto, said inner cylinder being provided with:
   i. a top portion the outer surface of which is joined by a spring to the inner surface of the top portion of the cap;
   ii. a longitudinal slit in its side portion, said slit extending from just below the upper end of the inner cylinder and terminating before reaching the lower end of the cylinder by curving to form a short lateral slip which engages a pin which projects inwardly from and is of integral construction with the cap; and
   iii. a calibrated scale on its outer side.

* * * * *